United States Patent
Nichols et al.

(10) Patent No.: US 10,650,458 B2
(45) Date of Patent: May 12, 2020

(54) SOCIAL SECURITY BENEFITS ESTIMATOR FOR MARRIED COUPLES

(75) Inventors: Connie Nichols, Jackson, NJ (US); Courtney Armstrong, East Windsor, NJ (US)

(73) Assignee: BLACKROCK INC., New York, NY (US)

( * ) Notice: Subject to any disclaimer, the term of this patent is extended or adjusted under 35 U.S.C. 154(b) by 1055 days.

(21) Appl. No.: 12/604,326

(22) Filed: Oct. 22, 2009

(65) Prior Publication Data

US 2011/0099123 A1    Apr. 28, 2011

(51) Int. Cl.
| | |
|---|---|
| G06Q 40/00 | (2012.01) |
| G06Q 40/08 | (2012.01) |
| G06Q 40/06 | (2012.01) |
| G06Q 40/02 | (2012.01) |

(52) U.S. Cl.
CPC ............ *G06Q 40/08* (2013.01); *G06Q 40/00* (2013.01); *G06Q 40/02* (2013.01); *G06Q 40/06* (2013.01)

(58) Field of Classification Search
CPC ........ G06Q 40/00; G06Q 20/29; G06Q 20/22; G06Q 40/04; G06Q 40/08; G06Q 40/02; G06F 17/60
USPC ........................................ 705/1–50; 235/180
See application file for complete search history.

(56) References Cited

U.S. PATENT DOCUMENTS

| | | | |
|---|---|---|---|
| 5,708,260 A | | 1/1998 | Maier et al. |
| 5,987,433 A | * | 11/1999 | Crapo .......................... 705/36 R |
| 6,625,582 B2 | | 9/2003 | Richman et al. |
| 8,600,851 B1 | * | 12/2013 | Pacheco ................. G06Q 40/04 |
| | | | 705/35 |
| 2002/0082965 A1 | | 6/2002 | Loeper |
| 2003/0023544 A1 | | 1/2003 | Chodes |
| 2003/0050883 A1 | | 3/2003 | Weir et al. |
| 2004/0158517 A1 | | 8/2004 | Mahaney et al. |
| 2005/0177509 A1 | * | 8/2005 | Mahaney ............. G06Q 20/102 |
| | | | 705/40 |
| 2006/0122924 A1 | | 6/2006 | Brustkern et al. |
| 2007/0038535 A1 | | 2/2007 | Hulsizer et al. |
| 2007/0061237 A1 | | 3/2007 | Merton et al. |

(Continued)

OTHER PUBLICATIONS

Andrew G. Biggs and Glenn R. Springstead, Alternate Measures of Replacement Rates for Social Security Benefits and Retirement Income, 2008, Social Security Bulletin, web, 2-19 (Year: 2008).*

(Continued)

*Primary Examiner* — I Jung Liu
(74) *Attorney, Agent, or Firm* — Haynes and Boone, LLP (57) ABSTRACT

A system for calculating estimated Social Security benefits for married couples. The system includes a server; a display device connected to the server; a user interface module running on the server, the user interface module being configured to receive input from a user and to display content on the display device; and a benefits calculator module running on the server and being configured to receive input data from the user interface module and to output data to the display device. The input data includes data regarding a married couple, including the assumed age of death for both the primary earner and the secondary earner. The system may output an estimated lifetime benefit using a hybrid approach wherein the secondary earner collects a reduced benefit at age 62 and a spousal benefit at full retirement age, and wherein the primary earner collects benefits at age 70.

6 Claims, 8 Drawing Sheets

(56) References Cited

U.S. PATENT DOCUMENTS

| | | | |
|---|---|---|---|
| 2007/0244777 A1 | 10/2007 | Torre et al. | |
| 2008/0010095 A1* | 1/2008 | Joyce | 705/4 |
| 2009/0077458 A1* | 3/2009 | Barry | 715/200 |
| 2010/0262437 A1* | 10/2010 | Roscoe | G06Q 40/08 705/4 |
| 2015/0127387 A1* | 5/2015 | Atwell | G06Q 40/08 705/4 |

OTHER PUBLICATIONS

"Social Security Calculator Tutorials"—http://sscalc.net, last accessed Apr. 14, 2010.
"Social Security Online—Benefit Calculators", http://www.ssa.gov/planners/calculators.htm, last accessed Apr. 14, 2010.
"Social Security Benefits Calculator", Allsup Online, http://www.allsup.com/, last accessed Apr. 14, 2010.
"Social Security Benefit Calculator", http://socialsecurityhop.com/, last accessed Apr. 14, 2010.
"Financial Calculators—Social Security Benefits", http://www.cpadirectory.com/, last accessed Apr. 14, 2010.
"Financial Calculators—Social Security Benefits", http://www2.aigretirement.com, last accessed Apr. 14, 2010.
"Spousal Benefit Another Key to Social Security Decision", http://www.foxnews.com/printer_friendly_story/0,3566,175742,00.html, published Nov. 16, 2005, last accessed Apr. 14, 2010.

* cited by examiner

Fig. 1

Social Security Benefits Estimator

How Can Married Couples Seek to Maximize Their Benefits?

After years of paying into Social Security, most of your clients want to get back as much as possible in retirement.

This tool will help your married clients develop a strategy for maximizing their benefits. It's simpler for your unmarried clients, but for couples, the factors to consider include:
- When each spouse should begin receiving benefits
- Longevity assumptions for each spouse
- Whose benefit each spouse collects Nearly three-quarters of recipients today opt for reduced benefits — without appreciating the impact this may have on their surviving spouse's benefits.

Use your clients' Social Security benefits estimates, combined with ages of death, to illustrate how lifetime benefits might compare under four retirement scenarios.

Step 1: Enter Your Clients' Data

Begin by entering your clients' data into the table below. The information needed can be found in the statement of estimated Social Security benefits that your client should receive each year about three months prior to their birthdays (Duplicate statements can be ordered here.)

|  | HUSBAND | WIFE |
|---|---|---|
| Year of Birth | 19___ | 19___ |
| Full Retirement Age (FRA) | Select ▾ | Select ▾ |
| Monthly Benefit at 62 | $ | $ |
| Monthly Benefit at FRA | $ | $ |
| Monthly Benefit at 70 | $ | $ |

FIG. 2

Social Security Benefits Estimator – Mozilla Firefox

Step 1: Enter Your Clients' Data

Begin by entering your clients' data into the table below.
The information needed can be found in the statement of estimated Social Security benefits—128
that your client should receive each year about three months—130
prior to their birthdays (Duplicate statements can be ordered here.)

|  | HUSBAND | WIFE |
|---|---|---|
| Year of Birth | 19 47 | 19 47 |
| Full Retirement Age (FRA) ⓘ | 66 ▾ | 66 ▾ |
| Monthly Benefit at 62 | $ 1614 | $ 416 |
| Monthly Benefit at FRA | $ 2257 | $ 552 |
| Monthly Benefit at 70 | $ 3042 | $ 729 |

Your Estimated Benefits

*Retirement You have earned enough credits to qualify for benefits. At you current earnings rate, if you stop working and start receiving benefits...
At age 62, your payment would be about............................................. $ 1,018 a month
If you continue working until...
your full retirement age (67 years), your payment would be about... $ 1,476 a month
age 70, your payment would be about............................................. $ 1,840 a month
*Disability You have earned enough credits to qualify for benefits. If you became disabled right now,
your payment would be about......................................................... $ 1,350 a month
*Family If you get retirement or disability benefits, your spouse and
*Survivors You have On the next page, you'll try out a number of assumed age of death estimates for each spouse, and learn how their benefits are affected depending on the age at which each spouse begins taking benefits.

Social Security Benefits Estimator

Reference Table: Estimated Monthly Benefits

These amounts are derived from Social Security-provided data and are used in the Estimated Lifetime Benefits table below.

| Wife's Earnings History | | Husband's Earnings History | | |
|---|---|---|---|---|
| Age | Monthly Benefit | Age | Monthly Benefit | Spousal Benefit* ⓘ | Survivor Benefit ⓘ |
| 62 | $416 | 62 | $1,614 | $406 | $1,862 |
| 66 | $552 | 66 | $2,257 | $577 | $2,257 |
| 70 | $729 | 70 | $3,042 | $400 | $3,042 |

*The spousal benefit is rounded to the nearest whole number when indicated in this table for reference, but the calculations below employ the actual benefit amount.

Step 2: Estimated Lifetime Benefits

The calculator below uses your clients' estimated monthly benefits to illustrate lifetime benefits totals. Where the individual has a choice of benefit, i.e. between their own and a spousal benefit, the calculator selects the higher benefit.

Run 2-3 different illustrations using different assumed ages of death, and of the resulting scenarios, look for the one that most often yields the higher estimated combined lifetime benefits.

▶ ASSUMPTION 1

FIG. 4

○ Social Security Benefits Estimator – Mozilla Firefox  — □ ×

▶ ASSUMPTION 1

| Assumed age of death: | Husband ☐ | 152 Wife ☐ | 154 | |
|---|---|---|---|---|
| AGE BENEFIT BEGINS: | BOTH AT 62* | BOTH AT FRA | BOTH AT 70 | Hybrid** |
| Wife Benefits | — | — | — | — |
| Spousal Benefit ⓘ | — | — | — | — |
| Husband Benefits | — | — | — | — |
| Survivor Benefit ⓘ | — | — | — | — |
| Total | | | | |

*If the primary earner is younger, but reaches 62 before the secondary has reached FRA, spousal benefit estimates are calculated using the fully reduced (age 62) adjusted spousal benefit. The actual spousal benefit received may be higher.

**The secondary earner collects their own reduced benefit at 62, an unreduced spousal benefit at FRA, and the primary earner collects at age 70. This strategy cannot be illustrated if the two are more than 5 years apart since the primary earner may have to file prior to the secondary reaching FRA. This would result in a reduced spousal benefit.

⊕ Add Assumption — 176

Start Over — 178

Print Report — 180

Done

Social Security Benefits Estimator – Mozilla Firefox

▼ ASSUMPTION 1

| Assumed age of death: | Husband 85 | Wife 92 | | |
|---|---|---|---|---|
| AGE BENEFIT BEGINS: | BOTH AT 62* | BOTH AT FRA | BOTH AT 70 | Hybrid** |
| Wife Benefits | $119,808 | $132,480 | $139,968 | $119,808 |
| Spousal Benefit ⓘ | $116,920 | $138,360 | $76,704 | $138,360 |
| Husband Benefits | $464,832 | $541,680 | $584,064 | $584,064 |
| Survivor Benefit ⓘ | $156,410 | $189,588 | $255,528 | $255,528 |
| Total | $857,970 | $1,002,108 | $1,056,264 | $1,097,760 |

*If the primary earner is younger, but reaches 62 before the secondary has reached FRA, spousal benefit estimates are calculated using the fully reduced (age 62) adjusted spousal benefit. The actual spousal benefit received may be higher.

**The secondary earner collects their own reduced benefit at 62, an unreduced spousal benefit at FRA, and the primary earner collects at age 70. This strategy cannot be illustrated if the two are more than 5 years apart since the primary earner may have to file prior to the secondary reaching FRA. This would result in a reduced spousal benefit.

▼ ASSUMPTION 2

| Assumed age of death: | Husband 89 | Wife 97 | | |
|---|---|---|---|---|
| AGE BENEFIT BEGINS: | BOTH AT 62* | BOTH AT FRA | BOTH AT 70 | Hybrid** |
| Wife Benefits | $139,776 | $158,976 | $174,960 | $139,776 |
| Spousal Benefit ⓘ | $136,406 | $166,032 | $95,880 | $166,032 |
| Husband Benefits | $542,304 | $650,016 | $730,080 | $730,080 |
| Survivor Benefit ⓘ | $178,754 | $216,672 | $292,032 | $292,032 |
| Total | $997,240 | $1,191,696 | $1,292,952 | $1,327,920 |

Social Security Benefits Estimator

SOCIAL SECURITY BENEFITS FOR YOU AND YOUR SPOUSE

Nearly three-quarters of recipients today opt for reduced benefits—not appreciating the impact this may have on their surviving spouse's benefits. The monthly benefits are derived from data entered from your Social Security statement, and are used in the Estimated Lifetime Benefits below

REFERENCE TABLE: ESTIMATED MONTHLY BENEFITS

Wife's Estimated Benefits

| Age Benefit Begins | Monthly Benefit |
|---|---|
| 62 | $416 |
| 66 | $552 |
| 70 | $729 |

Husband's Estimated Benefits

| Age Benefit Begins | Monthly Benefit | Adjusted Spousal Benefit[1] | Survivor Benefit |
|---|---|---|---|
| 62 | $1,614 | $406 | $1,862 |
| 66 | $2,257 | $577 | $2,257 |
| 70 | $3,042 | $400 | $3,042 |

ESTIMATED LIFETIME BENEFITS

The table below uses estimated monthly benefits to illustrate lifetime benefit totals under four different scenarios. Where you have a choice of benefit, i.e. between your own and a spousal benefit, the illustration uses the higher benefit. By looking at 2–3 different illustrations, using different age of death assumptions, you'll get a feel for the scenario that most often yields the higher totals.

ESTIMATED LIFETIME BENEFITS ASSUMPTION ONE: AGES OF DEATH: HUSBAND 85, WIFE 92

| Age Benefit Begins | Both Age 62[2] | Both Begin at FRA | Both Age 70 | Hybrid[3] |
|---|---|---|---|---|
| Wife's Benefit | $119,808 | $132,480 | $139,968 | $119,808 |
| Spousal Benefit | $116,920 | $138,360 | $76,704 | $138,360 |
| Husband's Benefit | $464,832 | $541,680 | $584,064 | $584,064 |
| Survivor Benefit | $156,410 | $189,588 | $255,528 | $255,528 |
| TOTAL BENEFIT RECEIVED | $857,970 | $1,002,108 | $1,056,264 | $1,097,760 |

FIG.8

SOCIAL SECURITY BENEFITS ESTIMATOR FOR MARRIED COUPLES

COPYRIGHT NOTICE

Portions of the disclosure of this patent document, including the drawings, contain material which is subject to copyright protection. The copyright owner has no objection to the reproduction of the patent document or the patent disclosure, as it appears in the records and files of the U.S. Patent and Trademark Office, but otherwise reserves all copyrights whatsoever.

BACKGROUND OF THE INVENTION

1. Field of the Invention

The present invention is directed to systems and methods for calculating estimated Social Security benefits. More specifically, the present invention is directed to systems and methods for determining the optimal approach a married couple should take to maximize Social Security benefits, including spousal and survivor benefits.

2. Background of the Related Art

In the United States, individuals who work and pay Social Security taxes for a prescribed number of years are entitled to receive their full Social Security retirement benefits when they reach full retirement age. Workers earn a credit for each quarter that they work and pay Social Security taxes, and retirement benefits are available to individuals who have earned at least 40 credits, meaning that they have worked and paid taxes for at least 10 years. Full retirement age ranges from 65 to 67 depending on the recipient's year of birth. For example, full retirement age for an individual born in 1954 is 66 years old, while full retirement age for an individual born in 1960 or later is 67 years old. When individuals reach their full retirement age, they are entitled to their primary insurance amount. An individual's primary insurance amount is based on the 35 years of employment during which he or she earned the highest salary.

Social Security retirement benefits can be claimed as early as age 62, although the benefit will be reduced by 20 to 30 percent depending on the individuals full retirement age. The Social Security Administration also offers deferred retirement credits to those who postpone collecting their benefits beyond their full retirement age. For every year beyond full retirement age that payments are put off, the Social Security Administration provides a guaranteed annual increase of 7 to 8 percent, depending on year of birth, to the individual's primary insurance amount. This is in addition to the annual cost of living adjustment to benefits.

In addition to their own benefits, individuals may also be eligible for spousal and survivor benefits. For a married couple, the Social Security Administration designates a primary earner and a secondary earner. The primary earner is defined as the spouse in the married couple having the higher primary insurance amount, or in other words, the higher monthly benefit. The secondary earner is defined as the spouse in the married couple having the lower primary insurance amount, or in other words, the lower monthly benefit.

While both spouses are living, the secondary earner is entitled to spousal benefits equal to 50 percent of the primary earner's primary insurance amount provided the primary earner has filed for benefits. If the secondary earner is also entitled to his or her own benefit, the individual benefit will pay first and the spousal benefit will make up the difference between that and 50% of the spouse's primary insurance amount. For example, if the primary earner had a primary insurance amount of $2,000, the secondary earner would be entitled to a spousal benefit of $1,000 at full retirement age. Assuming a primary insurance amount of $750 for the secondary earner, he or she would receive both the primary insurance amount payment of $750 and a spousal benefit payment of $250 to bring the total combined benefit to $1,000. If spousal benefits are collected prior to a spouse's full retirement age, the spousal benefit may be permanently reduced.

In the event that the primary earner dies first, the secondary earner may be entitled to survivor benefits. Survivor benefits will be at least equal to the primary earner's actual benefit at the time of death. If the primary earner dies before filing for benefits, the Social Security Administration will calculate the primary insurance amount for the decedent using the best 35 years of earnings as of the year of death. A surviving spouse can collect a survivor benefit as young as age 60, subject to a reduction. The decision by the primary earner concerning when to collect his or her individual Social Security benefits, whether it be at age 62, at full retirement age, at age 70, or somewhere in between these ages, has a direct impact on any survivor benefit that may be paid to the surviving spouse.

Given the many factors that must be taken into account, determining when and how to collect Social Security retirement benefits so as to optimize the benefits received as a married couple can be a difficult task. Accordingly, there is a need for systems and methods for determining the optimal approach for receiving Social Security benefits for married couples.

SUMMARY OF THE INVENTION

Advantages of the present invention will be set forth in and become apparent from the description that follows. Additional advantages of the invention will be realized and attained by the methods and systems particularly pointed out in the written description and claims, as well as from the appended drawings.

To achieve these and other advantages and in accordance with the purpose of the invention, as embodied herein, the invention includes a system for calculating estimated Social Security benefits for married couples. The system includes: a server; a display device connected to the server; a user interface module running on the server, the user interface module being configured to receive input from a user and to display content on the display device; and a benefits calculator module running on the server and being configured to receive input data from the user interface module and to output data to the display device. The input data includes data regarding a married couple, including the assumed age of death for both the primary earner and the secondary earner. The system may output an estimated lifetime benefit using a hybrid approach wherein the secondary earner collects a reduced benefit at age 62 and a spousal benefit at full retirement age, and wherein the primary earner collects benefits at age 70.

A method for calculating estimated lifetime Social Security benefits for a married couple is also disclosed. The method includes the steps of receiving data from a user at a benefits estimator server, the data including data regarding both a primary earner and a secondary earner in a married couple, including the assumed age of death for both the primary earner and the secondary earner; outputting data from the benefits estimator server to a display device; and displaying the output data in the form of a table, with rows of data corresponding to the plurality of Social Security benefits and columns corresponding to a plurality of options the married couple has for receiving the Social Security benefits. The output data includes estimated lifetime benefits for a plurality of Social Security benefits categories for the married couple. The plurality of options includes a hybrid option with the secondary earner collecting a reduced benefit at age 62 and a spousal benefit at full retirement age, and the primary earner deferring the collection of benefits until age 70.

BRIEF DESCRIPTION OF THE DRAWINGS

So that those skilled in the art to which the subject invention pertains will readily understand how to implement the systems and methods for calculating estimated Social Security benefits for married couples, without undue experimentation, preferred embodiments of the system and methods will be described in detail below with reference to the following figures:

FIG. 8 is an exemplary embodiment of a estimated lifetime benefits report generated by the system of FIG. 1.

DETAILED DESCRIPTION OF PREFERRED EMBODIMENTS

Reference will now be made in detail to the present preferred embodiments of the systems and methods for calculating estimated Social Security benefits for married couples. The systems and methods described in this disclosure are particularly well-suited for financial advisors counseling their clients as to the optimal timing for receiving Social Security benefits. For unmarried individuals, the determination as to when to take Social Security is relatively straight forward. However, for married couples, there are additional factors that must be considered, including when each spouse should begin receiving benefits, longevity assumptions for each spouse, and whose benefit each spouse will collect. In one exemplary embodiment, the system includes functionality for calculating various benefits scenarios and displaying a report showing the results of each scenario, which can then be used when counseling clients concerning strategies for maximizing Social Security benefits. The report may include the results of a hybrid approach to collecting Social Security benefits, which may help a married couple maximize the payment of both individual benefits as well as spousal and survivor benefits.

In one exemplary embodiment, the hybrid approach includes the secondary earner claiming his or her benefits at age 62, his or her spousal benefit at full retirement age, and the primary earner deferring his or her receipt of benefits until age 70. This approach is particularly advantageous if the primary earner is older. If the primary earner is within five years of the secondary earner, the secondary earner would file at 62 and collect his or her individual benefit. When the secondary earner reaches full retirement age, the primary earner would file for benefits to allow spousal benefits to be paid, but suspend collecting until he or she reaches age 70. By filing for benefits when the secondary earner reaches full retirement age, the primary earner enables the spouse to collect an unreduced spousal benefit in addition to his or her reduced individual benefit. Deferring collection to age 70 allows for the highest possible benefit to be paid not only during the primary earner's lifetime, but also as a survivor benefit when the primary earner dies.

Figure 1:
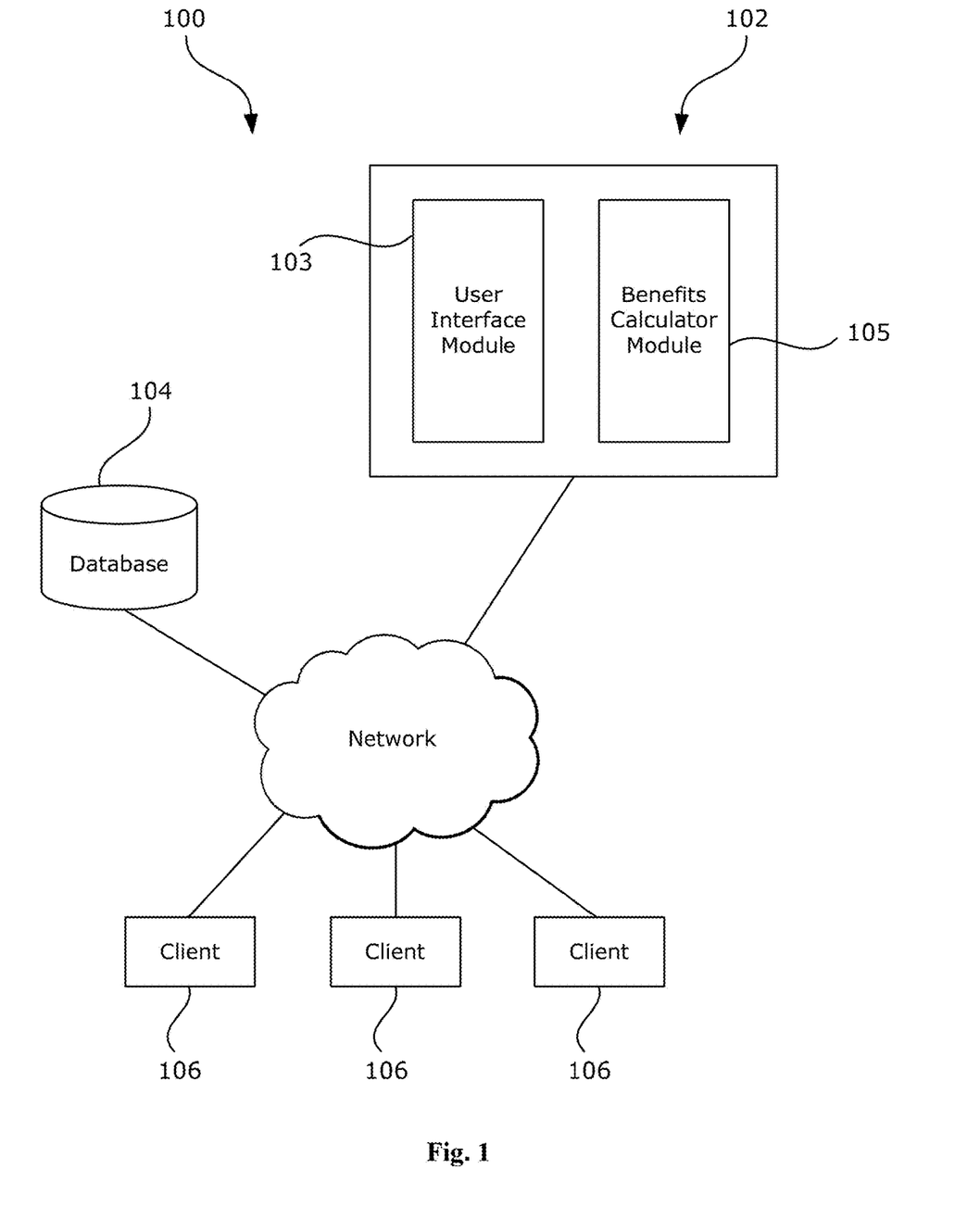
FIG. 1 is a schematic illustration of the system for calculating estimated Social Security benefits for married couples.

For purposes of explanation and illustration, and not limitation, an exemplary embodiment of a system in accordance with the present invention is shown in FIG. 1 and designated generally by the reference numeral 100. System 100 includes a benefits estimator server computer 102, a database 104, and a plurality of client devices 106. Database 104, benefits estimator server 102, and client devices 106 may interface with one another via a network 108. Network 108 may be any suitable network, including a company intranet or other local area network, a wide area network, and the Internet. Server 102 may include a plurality of servers, and database 104 may include a plurality of databases. Client devices may include a computer, a mobile phone, or any other network-enabled device.

System 100 may comprise software components running on either benefits estimator server 102 or clients 106. Server 102 and clients 106 may run any suitable operating system and may include a variety of hardware configurations. Both benefits estimator server 102 and clients 106 may include a processor coupled to a memory module and to a mass storage device via a bus or other communication medium; a display or other output device interfacing with the processor; and a keyboard, mouse, touchpad, or other input device that receives input from a user and interfaces with the processor. In one exemplary embodiment, clients 106 each include an input device for receiving user input and a display device for displaying content. The software implementing system 100 may include instructions written in a high level computer language and stored in a mass storage device. In one exemplary embodiment, a plurality of modules having distinct functions run on benefits estimator server 102. For example, benefits estimator server 102 may include a user interface module 103 and a benefits calculator module 105.

In one exemplary embodiment, server 102 is a secure server requiring authentication from a user prior to allowing access to system 100. For example, upon receiving a request from a web browser running on client 106, server 102 may require the user to login by entering a user name and password. Once server 102 has determined that the user is an authorized user, the user will be granted access to system 100. In one exemplary embodiment, the user is a financial advisor or planner. Authentication data may be stored in database 104.

Figure 2:
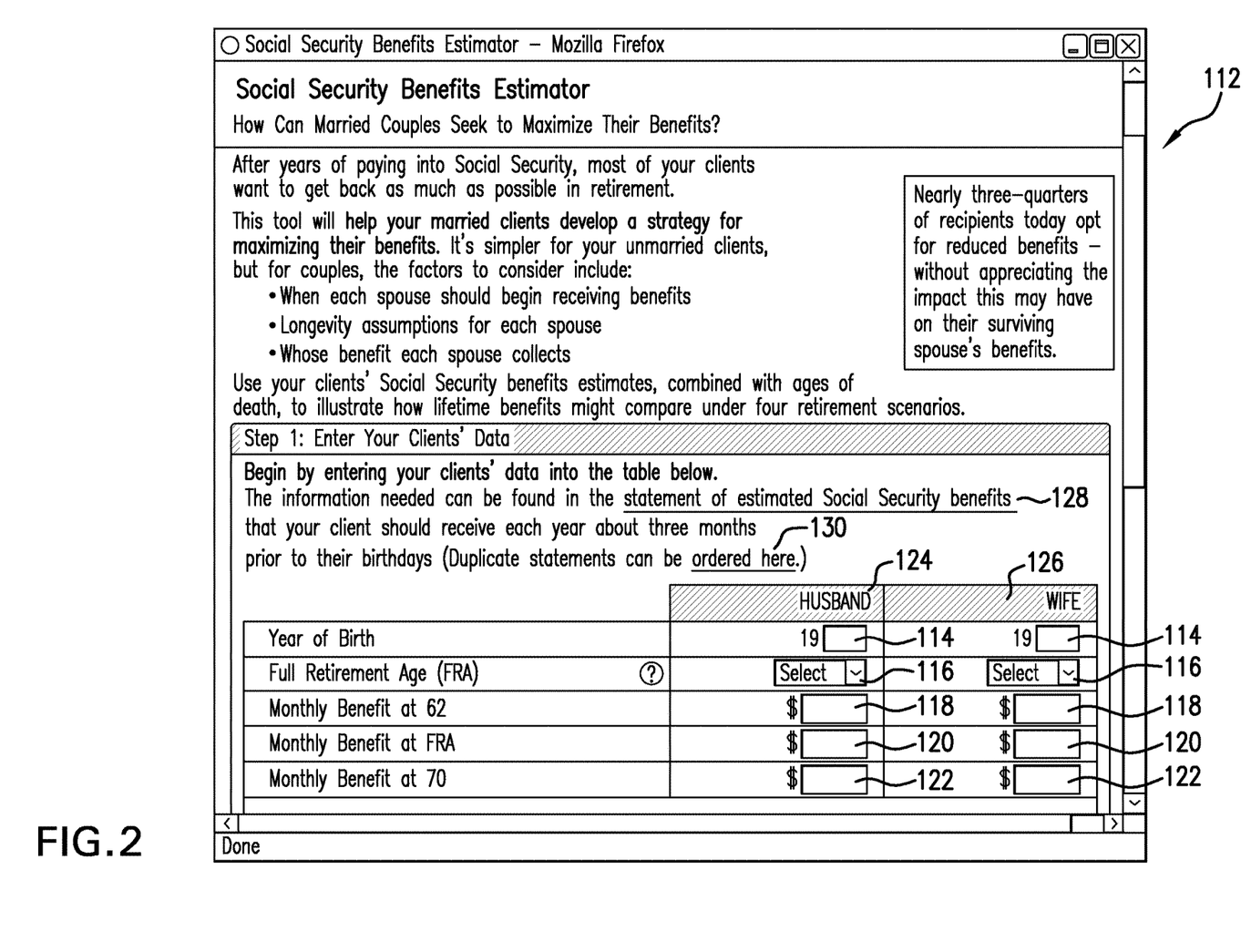
FIG. 2 is an exemplary embodiment of a portion of the user interface for the system of FIG. 1, showing an initial data entry page.

FIG. 2 illustrates an exemplary portion of a graphical user interface 110 that provides access to system 100 once a user has been properly authenticated. In the exemplary embodiment shown, graphical user interface 110 is presented by benefits estimator server 102 through a web browser or other suitable software application running on client 106. Once benefits estimator server 102 has authenticated the user, the user will have access to an initial data entry page 112. The system described in this disclosure is particularly useful for financial planners, allowing the financial planner to provide a married couple with sound advice regarding the best approach to receiving Social Security benefits.

As shown in FIG. 2, initial data entry page 112 includes a plurality of fields allowing a user to enter data regarding a married couple. In the exemplary embodiment shown, initial data page 112 includes a year of birth field 114, a full retirement age field 116, a monthly benefit at age 62 field 118, a monthly benefit at full retirement age (FRA) field 120, and a monthly benefit at age 70 field 122 for each spouse, arranged in a husband column 124 and a wife column 126. The information needed to populate the data fields can be found in the Social Security statement that each individual paying Social Security taxes receives each year from the Social Security Administration. As shown in FIG. 2, initial data entry page 112 may include a link 128 that takes a user to a page hosted by the Social Security Administration explaining the what the Social Security statement is as well as a link 130 to a web page that includes information on ordering duplicate copies of the statement.

Figure 3:
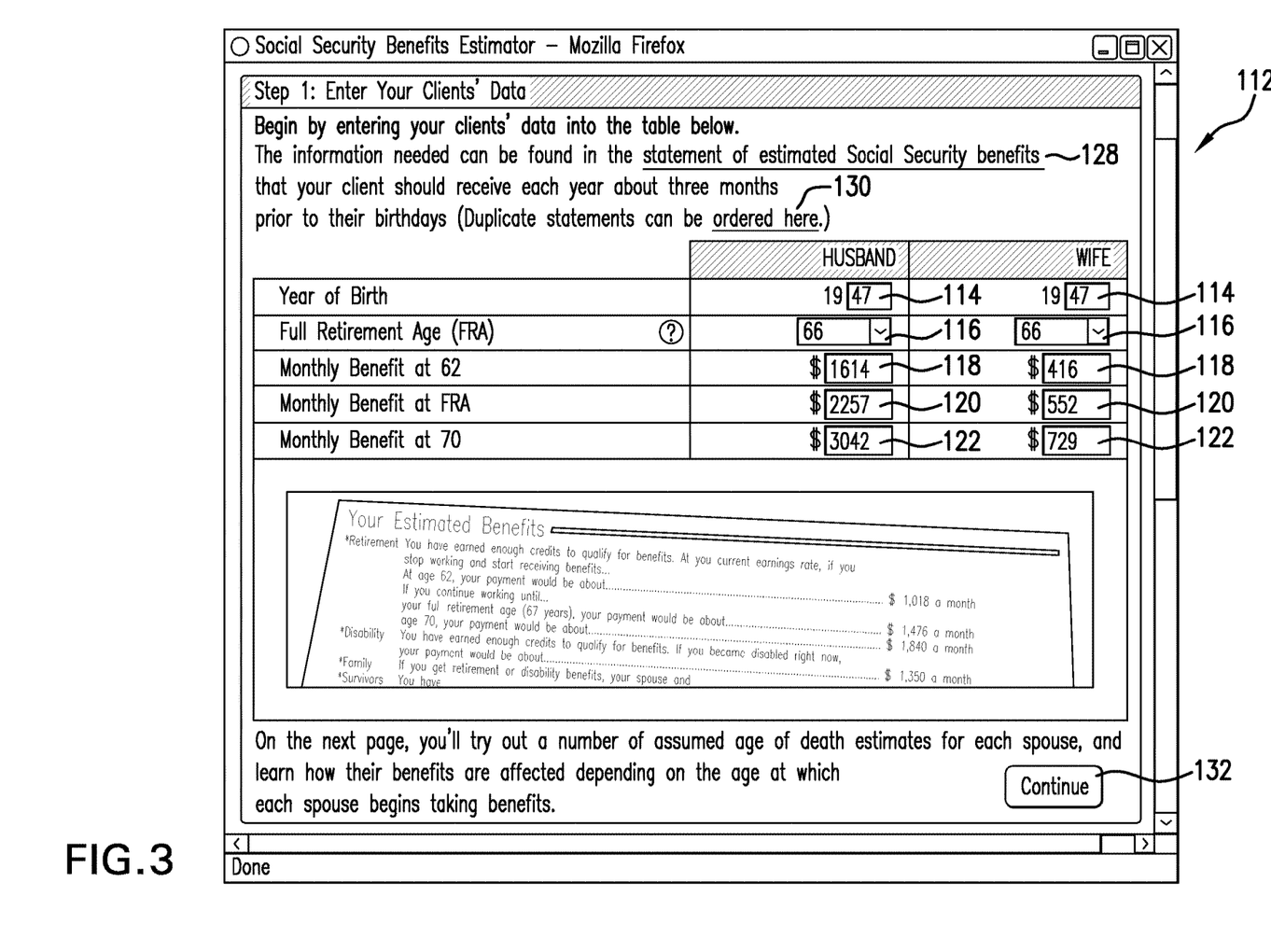
FIG. 3 is an exemplary embodiment of a portion of the user interface for the system of FIG. 1, showing an initial data entry page with data entered into various data fields.

FIG. 3 is an additional illustration of initial data entry page 112 with each of the data fields populated with client data. In the example shown in FIG. 3, the user has entered the birth year for both the husband and wife as 1947, and the full retirement age as 66 for both spouses as well. In the exemplary embodiment shown, full retirement age field 116 is a pull-down menu with a predetermined number of selections that include all possible retirement ages, as determined by the Social Security Administration. In another exemplary embodiment, full retirement age field 116 is automatically populated based on the data entered in year of birth field 114. In the example shown in FIG. 3, the husband would be designated as the primary earner because his estimated monthly benefit at full retirement age ($2,257) is higher than the estimated monthly benefit at full retirement age for the wife ($552). In one exemplary embodiment, data regarding the retirement ages based on date of birth is stored in database 104 and accessed by benefits estimator server 102 to determine the appropriate full retirement age to be used for both the primary earner and the secondary earner.

Figure 4:
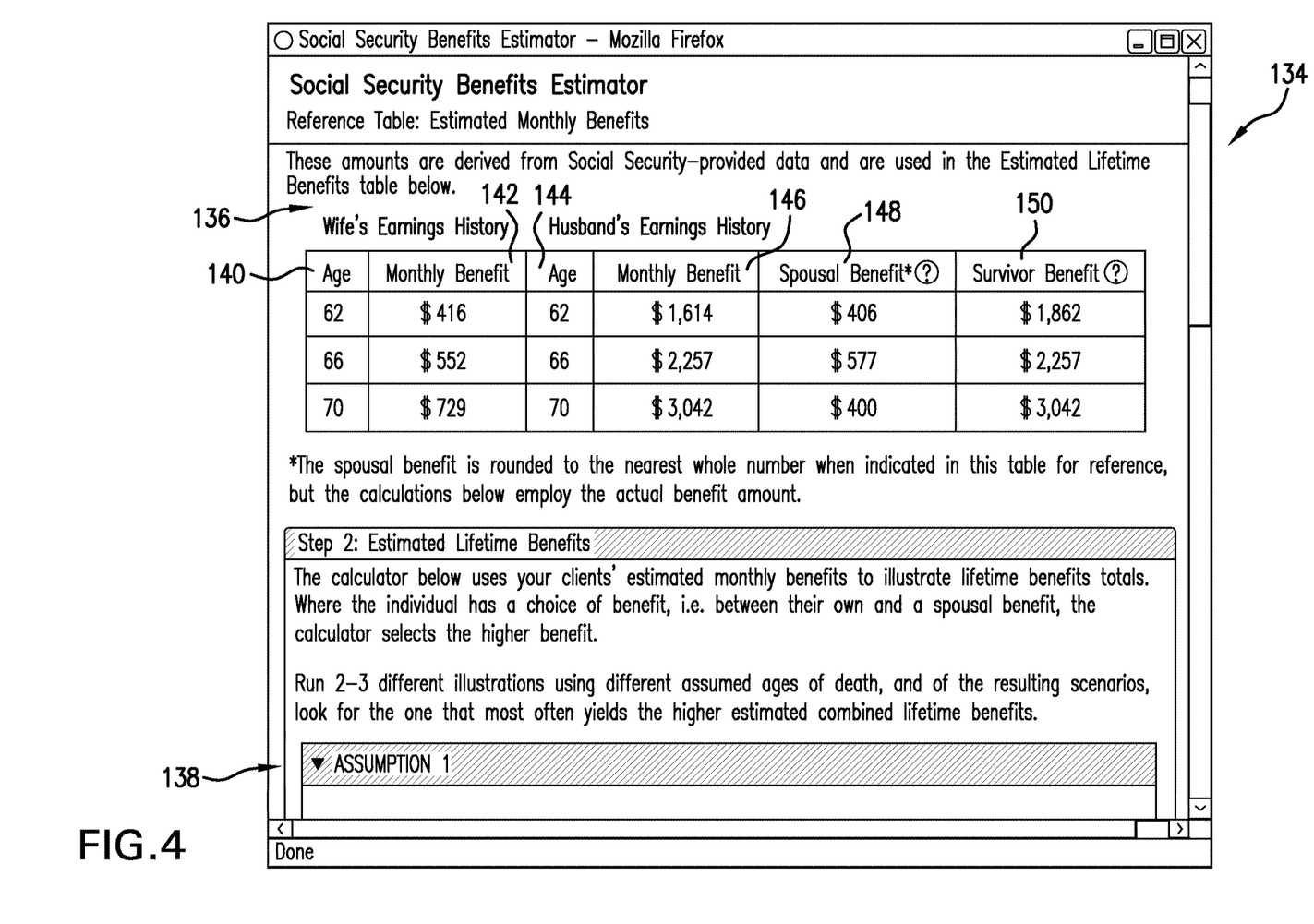
FIG. 4 is an exemplary embodiment of a portion of the user interface for the system of FIG. 1, showing the earnings history section of an estimated lifetime benefits page.

Once the estimated benefits from the Social Security statement have been entered into initial data entry page 112, the user will click on or otherwise select a Continue button 132 to access an estimated lifetime benefits page 134, as shown in FIG. 4. This page allows the user to enter a number of assumed age of death estimates for each spouse and learn how the benefits received by each spouse would be affected by the age at which each spouse begins taking benefits.

Estimated lifetime benefits page 134 includes two sections: an earnings history section 136 and an assumption section 138. Earning history section 136 may include a table summarizing the earning history for both the primary earner and the secondary earner. For the secondary earner, the table may include an age column 140 and a monthly benefit column 142, showing the monthly benefit if the secondary earner were to retire at age 62, at full retirement age (age 66 in the example shown in FIG. 4), and at age 70, as entered by the user in initial data entry page 112. For the primary earner, the table will also include an age column 144, and a monthly benefit column 146, as well as a spousal benefit column 148 and a survivor benefit column 150. Data shown in monthly benefit column 146 for the primary earner is taken directly from the data entered into initial data entry page 112. Data shown in spousal benefit column 148 and survivor benefit column 150 is calculated based on the rules set forth by the Social Security Administration. In one exemplary embodiment, these rules may be stored in database 104 and accessed by benefits estimator server 102 to calculate the data shown in spousal benefit column 148 and survivor benefit column 150. In one exemplary embodiment, the amounts shown in spousal benefit column 148 are rounded to the nearest whole number for display in the table of the earning history section 136, however further calculations may use the actual benefit amount rather than the rounded amount. The data stored in database 104 may be automatically updated to reflect any change in the rules set forth by the Social Security Administration or by law.

Figure 5:
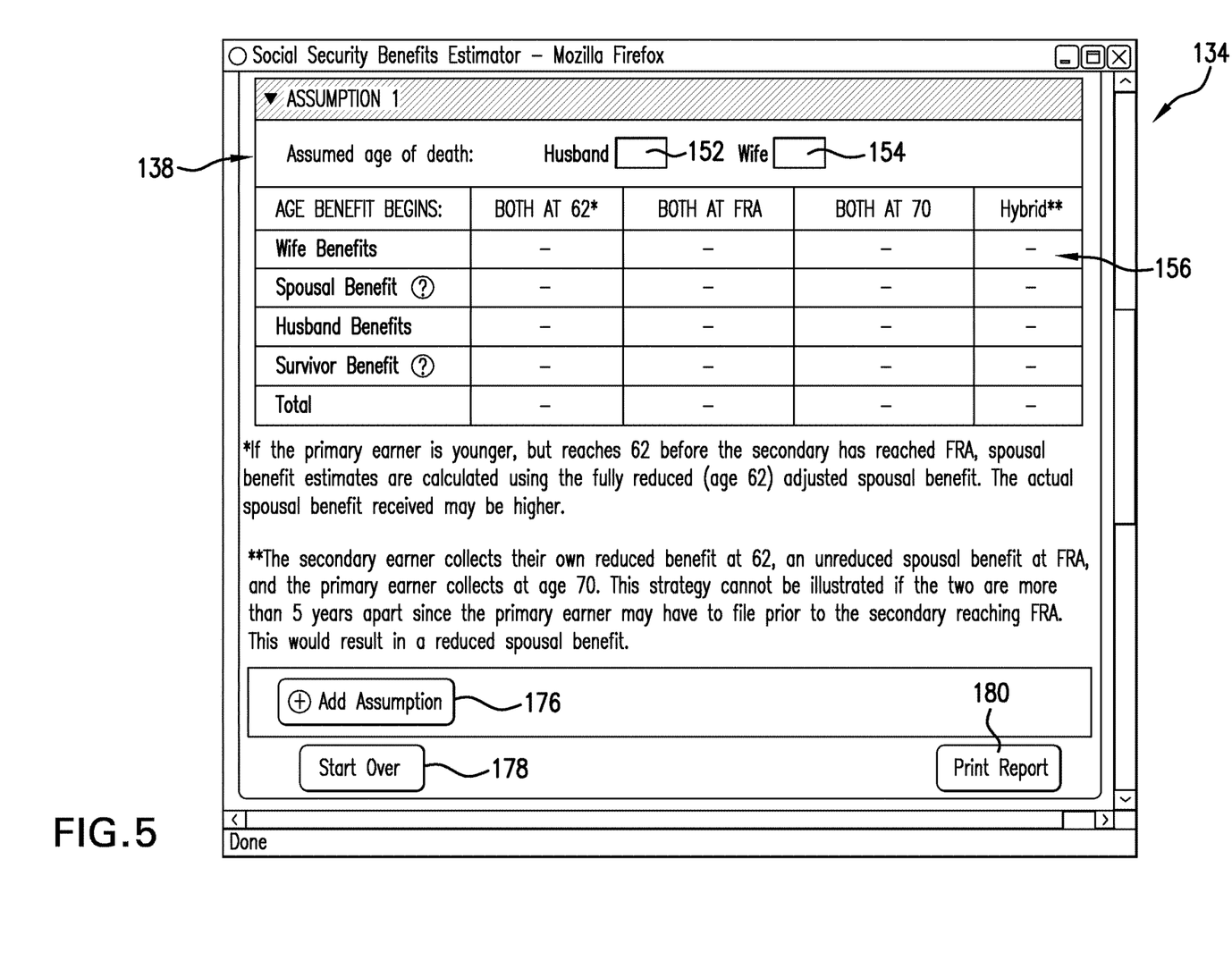
FIG. 5 is an exemplary embodiment of a portion of the user interface for the system of FIG. 1, showing a blank estimated lifetime benefits table.
Figure 6:
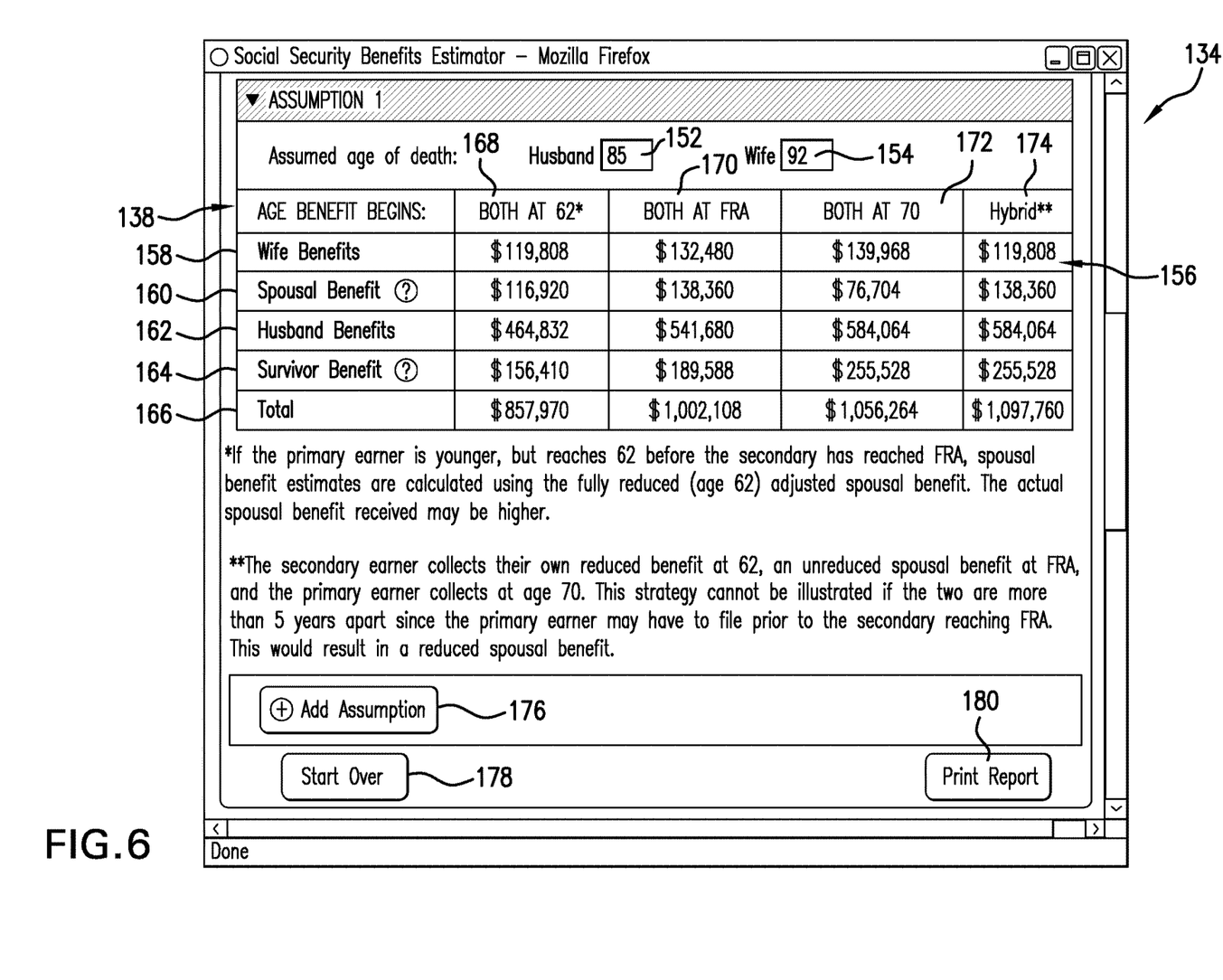
FIG. 6 is an exemplary embodiment of a portion of the user interface for the system of FIG. 1, showing a populated estimated lifetime benefits table.
Figure 7:
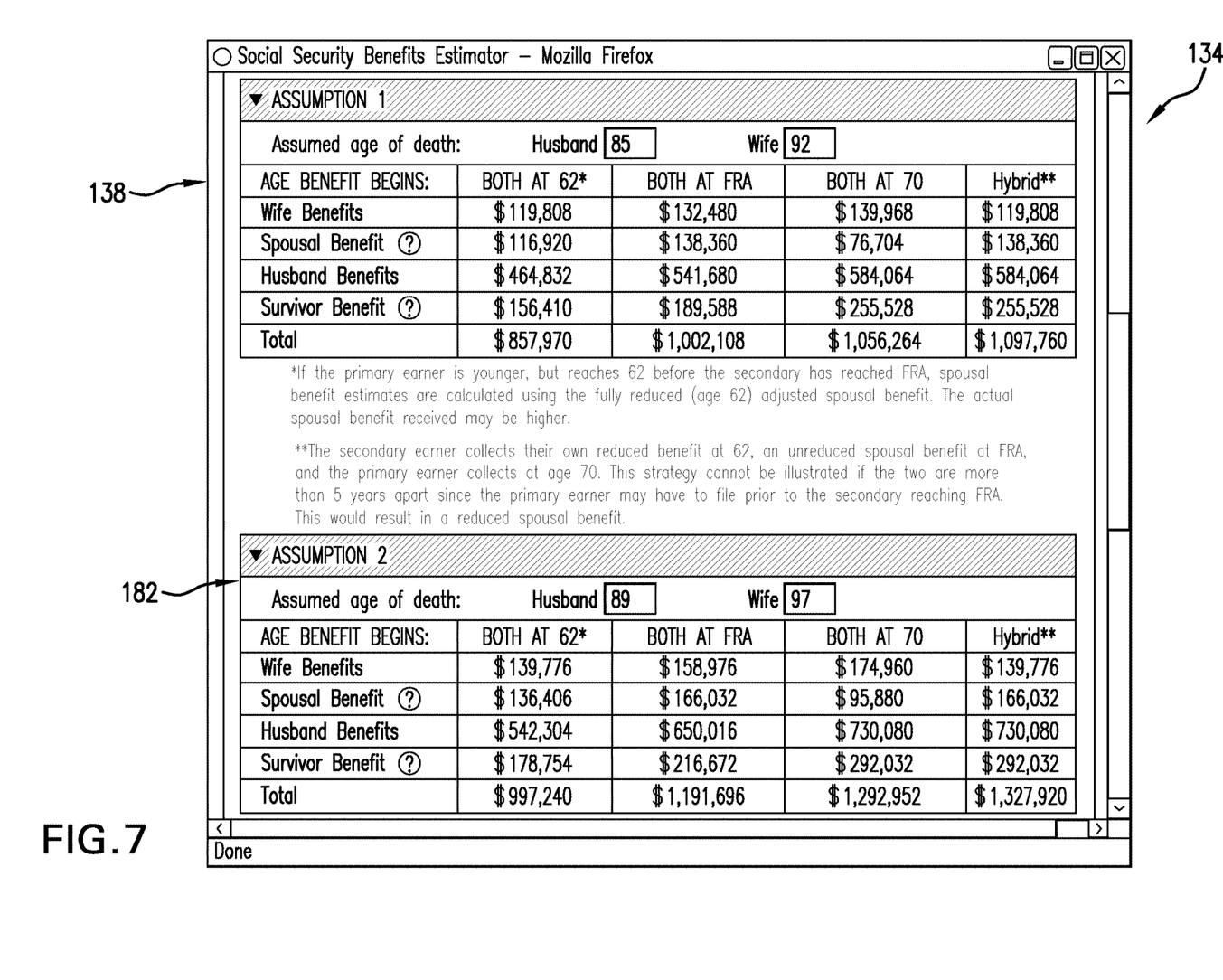
FIG. 7 is an exemplary embodiment of a portion of the user interface for the system of FIG. 1, showing an additional populated estimated lifetime benefits table using different assumed ages of death for each spouse.

Additional views of assumption section 138 of estimated lifetime benefits page 134 are shown in FIGS. 5 through 7. As shown in FIG. 5, assumption section 138 includes an assumed age of death data entry field 152 for the primary earner as well as an assumed age of death data entry field 154 for the secondary earner. Once the user has entered an assumed age of death in both field 152 and field 154, an estimated lifetime benefits table 156 is automatically populated, as shown in FIG. 6.

In the exemplary embodiment shown in FIG. 6, estimated lifetime benefits table 156 may include a secondary earner benefits row 158 (Wife Benefits in the example shown in FIGS. 5 through 7), a Spousal Benefits row 160, a primary earner benefits row 162 (Husband Benefits in the example shown in FIGS. 5 through 7), a Survivor Benefits row 164, and a Total row 166. Table 156 may also include columns listing various retirement benefit scenarios for a married couple. In the example shown in FIG. 6, table 156 includes a Both at 62 column 168, a Both at FRA column 170, a Both at 70 column 172, and a Hybrid column 174. In each of the columns, an estimated lifetime amount is shown for the corresponding benefits row.

Once the user has entered an assumed age of death in both field 152 and 154, the data shown in table 156 is calculated by benefits estimator server 102 and automatically displayed within the table. Both at 62 column 168 displays the calculated estimated lifetime benefits for each of the benefits rows if both spouses were to begin receiving Social Security Benefits at age 62, the earliest age at which the Social Security Administration allows an individual to begin receiving benefits. If the primary earner is younger, but reaches 62 before the secondary earner has reached full retirement age, spousal benefits estimates shown in table 156 may be calculated using the fully reduced (age 62) adjusted spousal benefit. The actual spousal benefit received from the Social Security Administration may be higher.

The Both at FRA column displays the calculated estimated lifetime benefits for each of the benefit rows if both spouses were to begin receiving benefits at each spouse's respective full retirement age. The full retirement age may be different for each spouse, depending on their ages.

The Both at 70 column displays the calculated estimated lifetime benefits for each of the benefits rows if each spouse were to delay receiving Social Security benefits until age 70, after which there is no advantage to further delaying benefits because the Social Security Administration no longer awards deferred retirement credits after the age of 70. For each of the columns in table 156, the calculated value for each of the benefits rows is summed by server 102 and displayed in the Total row 166 for each column. The Total row 166 allows the user to quickly see which of all the scenarios will provide the clients with the highest benefit amount based on the assumed age of death for each spouse.

Hybrid column 174 displays the calculated estimated lifetime benefits for each of the benefits row using a hybrid approach. Under this hybrid approach, the secondary earner collects her own reduced benefit at age 62, and an unreduced spousal benefit at full retirement age while the primary earner defers collection of benefits until age 70. This hybrid strategy may not be illustrated if the spouses are more than five years apart in age, since such a scenario may require the primary earner to file for benefits prior to the secondary earner reaching full-retirement age. Estimated lifetime benefits table 156 allows the user to quickly analyze various strategies and provide clients with sound advice regarding the optimal time to start receiving benefits. As shown in FIG. 6, the hybrid approach often results in the maximum benefit amount when compared with other approaches.

As shown in FIGS. 5 and 6, assumption section 138 of estimated lifetime benefits page 134 may include an Add Assumption button 176, a Start Over button 178, and a Print Report button 180. By selecting Add Assumption button 176, the user can dynamically add an additional estimated lifetime earnings table 182, as shown in FIG. 7. This allows the user to enter new assumed ages for the death of each spouse, which in turn causes server 102 to calculate new data and populate the additional table 182. This functionality allows the user to try out a number of assumed age of death estimates for each spouse and learn how the clients' benefits will be affected by viewing the data for the different estimates together on a single page. The tables shown in FIG. 7 use the monthly benefits entered by the user to illustrate the lifetime benefit totals under four different scenarios. When one of the spouses has a choice of benefit, for example, between an individual benefit and a spousal benefit, the higher of the two benefits is shown. The Add Assumption button 176 allows the user to add a plurality of additional tables. By looking at several tables, each based on different assumptions for the age of death, a user will quickly get a feel for the scenario that most often yields the highest total benefit to the married couple.

Selecting Start Over button 178 will take the user back to initial data entry page 112, allowing the user to edit the previously entered data or enter new data and perform a new calculation. Selecting Print Report button 180 generates a printable report that summarizes all of the data entered into initial data entry page 112 as well as the data calculated on estimated lifetime benefits page 134. An example of such a report in shown in FIG. 8. Although the example report shown in FIG. 8 illustrates only a single scenario, the report may show all of the scenarios that a user has produced using system 100.

The present invention, as described above and shown in the drawings, provides for systems and methods for calculating estimated Social Security benefits for married couples and determining the scenario that will yield the maximum total benefit for the couple. It will be apparent to those skilled in the art that various modifications and variations can be made to the systems and methods of the present invention without departing from the scope of the invention as outlined in the appended claims and their equivalents.

The invention claimed is:

1. A system for calculating estimated Social Security benefits for a married couple, the system comprising:
   a benefits estimator server;
   a rules database networked coupled to and separate from the benefits estimator server configured to automatically update to reflect change in rules regarding calculation of social security benefits wherein the rules database is coupled to the benefits estimator server via a network;
   a user device coupled, via a network, to the benefits estimator server via the Internet;
   a user interface provided by the benefits estimator server, the user interface being configured to receive input from the user device and to display content on the a display provided on a display provided on the user device;
   a calculator provided by the benefits estimator server configured to receive input data from the user interface and to receive social security calculation rules from the rules database and is further configured to output data to the user display based on the received input data and social security calculation rules, wherein the input data includes data regarding both a primary earner and a secondary earner in a married couple, including an estimated age of death for both the primary earner and the secondary earner, and wherein the output data includes benefits for a plurality of Social Security benefits categories for the married couple including:
   a value when both the primary and the secondary earner take benefits at age 62;
   a value when both the primary and the secondary earner take benefits at full retirement age;
   a value when both the primary and the secondary earner take benefits at age 70; and
   a value when the married couple employs a hybrid approach wherein the secondary earner collects a reduced benefit at age 62 and a spousal benefit at full retirement age, and wherein the primary earner collects benefits at age 70.

2. The system of claim 1, wherein the input data further includes the year of birth and full retirement age for both the primary earner and the secondary earner in the married couple.

3. The system of claim 1, wherein the input data further includes a value for the monthly benefit at age 62, monthly benefit at full retirement age, and monthly benefit at age 70 for both the primary earner and the secondary earner in the married couple.

4. The system of claim 1, wherein the plurality of Social Security benefits categories includes primary earner benefits, secondary earner benefits, survivor benefits, and spousal benefits.

5. The system of claim 1, wherein the output data is presented in the form of a table, with rows of data corresponding to the plurality of Social Security benefits and columns corresponding to a plurality of options the married couple has for receiving the Social Security benefits.

6. The system of claim 5, wherein the plurality of Social Security benefits categories includes primary earner benefits, secondary earner benefits, survivor benefits, and spousal benefits.

* * * * *